United States Patent
Xu et al.

(10) Patent No.: US 12,369,084 B2
(45) Date of Patent: Jul. 22, 2025

(54) METHOD AND SYSTEM FOR TRANSMITTING NEIGHBOR CELL CONFIGURATION INFORMATION, AND A COMPUTER-READABLE STORAGE MEDIUM

(71) Applicant: CHINA TELECOM CORPORATION LIMITED, Beijing (CN)

(72) Inventors: Sen Xu, Beijing (CN); Hongliang Bian, Beijing (CN); Le Zhang, Beijing (CN); Zhenqiang Sun, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 861 days.

(21) Appl. No.: 17/595,213

(22) PCT Filed: May 27, 2020

(86) PCT No.: PCT/CN2020/092500
§ 371 (c)(1),
(2) Date: Nov. 11, 2021

(87) PCT Pub. No.: WO2020/248816
PCT Pub. Date: Dec. 17, 2020

(65) Prior Publication Data
US 2022/0225185 A1   Jul. 14, 2022

(30) Foreign Application Priority Data

Jun. 11, 2019 (CN) .......................... 201910500450.X (51) Int. Cl.
*H04W 36/00* (2009.01)
*H04B 7/155* (2006.01)
(Continued)

(52) U.S. Cl.
CPC ............... *H04W 36/00835* (2018.08); *H04B 7/15507* (2013.01); *H04W 36/0061* (2013.01); *H04L 5/0048* (2013.01); *H04W 88/10* (2013.01)

(58) Field of Classification Search
CPC ....... H04W 36/0061; H04W 36/00835; H04W 84/047; H04W 88/10; H04W 92/20; H04B 7/15507
See application file for complete search history.

(56) References Cited

U.S. PATENT DOCUMENTS

2020/0358508 A1* 11/2020 Li ..................... H04W 72/0453
2022/0225185 A1*  7/2022 Xu ..................... H04B 7/15507

FOREIGN PATENT DOCUMENTS

| CN | 102291789 | 12/2011 |
| CN | 104335512 | 2/2015 |

(Continued)

OTHER PUBLICATIONS

International Search Report received in International Patent Application No. PCT/CN2020/092500, mailed Aug. 6, 2020.

(Continued)

*Primary Examiner* — Matthew D. Anderson
*Assistant Examiner* — Dung L Lam
(74) *Attorney, Agent, or Firm* — Andrew M. Calderon; Calderon Safran & Wright P.C.

(57) ABSTRACT

Provided by the present disclosure are an neighbor cell configuration information transmission method and system, and a computer-readable storage medium. In the neighbor cell configuration information transmission system, when a CSI-RS configuration used for mobility measurement in at least one associated cell is updated, a first base station determines, according to an neighbor cell relationship, a second base station corresponding to an neighbor cell of the cell the CSI-RS configuration of which was updated; the first base station sends the updated CSI-RS configuration information to a selected first relay node, the first relay node sends the updated CSI-RS configuration information to the second base station, and according to the updated CSI-RS configuration information, the second base station instructs a terminal within a coverage range of the second base station to perform corresponding measurement on the cell associated with the first base station.

12 Claims, 6 Drawing Sheets

(51) Int. Cl.
   *H04L 5/00*       (2006.01)
   *H04W 88/10*      (2009.01)

(56)           References Cited

FOREIGN PATENT DOCUMENTS

| CN | 108418667  | 8/2018 |
| CN | 112073163  | 2/2019 |
| WO | 2019033072 | 2/2019 |

OTHER PUBLICATIONS

Written Opinion received in International Patent Application No. PCT/CN2020/092500, mailed Aug. 6, 2020.
R2-1814147, Discussion and Decision for Inter nod message for CSI-RS confirmation, 3GPP TSG-RAN WG2, Meeting #103, Chengdu, China, Oct. 8-12, 2018.
R3-192962, Discussion and Approval for Avoiding Mobility Failures due to Slice Availability, 3GPP TSG-RAN3, Meeting #104, Deutsche Telekom, Reno, NV, US, May 17, 2019.
R3-185894, Discussion for CSI-RS configuration transfer, 3GPP TSG-RAN WG3, Meeting #101, Chengdu, China, Oct. 8-12, 2018.
R3-182920, pCR for Acquisition of neighbour cell's CSI-RS resource configuration, 3GPP TSG-RAN3, Meeting #100, Busan, Korea, May 25, 2018.
S2-1810428, Change Request for Configuration Transfer Procedure, 3GPP TSG-WG2, Meeting #129, Dongguan, China, Oct. 15-19, 2018.

* cited by examiner

METHOD AND SYSTEM FOR TRANSMITTING NEIGHBOR CELL CONFIGURATION INFORMATION, AND A COMPUTER-READABLE STORAGE MEDIUM

CROSS-REFERENCE TO RELATED APPLICATIONS

The present application is a U.S. National Stage Application under 35 U.S.C. § 371 of International Patent Application No. PCT/CN2020/092500, filed on May 27, 2020, which is based on and claims priority from CN application No. 201910500450.X, filed on Jun. 11, 2019, the disclosure of both of which are hereby incorporated into this disclosure by reference in its entirety.

TECHNICAL FIELD

The present disclosure relates to the field of wireless communications, and in particular, to a method and system for transmitting neighbor cell configuration information, and a computer-readable storage medium.

BACKGROUND

In the related art, there are two measurement references for inter-cell handover, which are SSB (Synchronization Signal Block) based measurement and CSI (Channel State Information)-RS (Reference Signal) based measurement.

The SSB has a frequency domain width of only 20 PRBs (Physical Resource blocks), and cannot measure the condition of the whole channel, while the CSI-RS can be configured to be full-band. In addition, the beams of the CSI-RS are narrower than the beams of the SSB, and can reflect the actual service beam condition. In some scenarios, the beamwidth of the SSB may differ significantly from that of the service beam of the user. Therefore, the measurement result based on the CSI-RS has higher accuracy than the handover based on the SSB based measurement.

SUMMARY

According to a first aspect of the embodiments of the present disclosure, there is provided a method for transmitting a neighbor cell configuration information, comprising: determining, by a first base station, a second base station corresponding to a neighbor cell of a cell whose channel state information reference signal (CSI-RS) configuration is updated according to a neighboring cell relationship under a condition that the CSI-RS configuration for mobility measurement in at least one associated cell is updated, wherein the first base station and the second base station both support an air interface of a New Radio (NR), and no interface for direct communication exists between the first base station and the second base station; transmitting, by the first base station, an updated CSI-RS configuration information to a selected first relay node, wherein the first relay node is associated with modes of the first base station and the second base station; transmitting, by the first relay node, the updated CSI-RS configuration information to a second base station; indicating, by the second base station, a terminal in a coverage of the second base station to measure cells associated with the first base station according to the updated CSI-RS configuration information.

In some embodiments, the first relay node is a first access and mobility management function (AMF) entity connected to the first base station under a condition that the first base station and the second base station are both in an standalone (SA) mode.

In some embodiments, the transmitting the updated CSI-RS configuration information to the selected first relay node comprises: transmitting, by the first base station, an uplink Radio Access Network (RAN) configuration transmission information to the first relay node by using an interface between the first base station and the first relay node, wherein the uplink RAN configuration transmission information comprises a first base station identifier, a tracking area identifier corresponding to the first base station identifier, a second base station identifier and a tracking area identifier corresponding to the second base station identifier and the updated CSI-RS configuration information.

In some embodiments, the transmitting the updated CSI-RS configuration information to the second base station comprises: determining, by the first relay node, whether the second base station is located in a coverage of the first relay node according to the second base station identifier and the tracking area identifier corresponding to the second base station identifier; transmitting, by the first relay node, the updated CSI-RS configuration information to the second base station by using a downlink RAN configuration transmission information under a condition that the second base station is located in the coverage of the first relay node; transmitting, by the first relay node, the updated CSI-RS configuration information to a second relay node under a condition that the second base station is not located in the coverage of the first relay node, wherein the second relay node is a second AMF entity connected with the second base station; transmitting, by the second relay node, the updated CSI-RS configuration information to a second base station by using the downlink RAN configuration transmission information.

In some embodiments, updating, by the second base station, a current CSI-RS configuration information of a cell whose CSI-RS configuration is updated in a neighbor cell list by using the updated CSI-RS configuration information and the first base station identifier.

In some embodiments, determining, by the second base station, whether the CSI-RS measurement is in an on state by using the updated CSI-RS configuration information; indicating, by the second base station, the terminal to measure the cell associated with the first base station according to the CSI-RS measurement by using a Radio Resource Control (RRC) reconfiguration information under a condition that the CSI-RS measurement is in an on state; indicating, by the second base station, the terminal to measure the cell associated with the first base station by using a synchronization signal block (SSB) by using the RRC reconfiguration information under a condition that the CSI-RS measurement is in an off state.

In some embodiments, the first relay node is a third base station having a direct communication interface with the first base station under a condition that the first base station is in a non-standalone (NSA) mode, wherein the third base station supports an air interface of long term evolution (LTE).

In some embodiments, the transmitting the updated CSI-RS configuration information to the selected first relay node comprises: transmitting, by the first base station, the updated CSI-RS configuration information to a first relay node by using an EUTRA-NR dual connection (EN-DC) configuration update information; updating, by the first relay node, the neighbor cell list by using the updated CSI-RS configuration information, and transmitting an EN-DC configuration update confirmation information to the first base station.

In some embodiments, the transmitting the updated CSI-RS configuration information to the second base station comprises: determining, by the first relay node, whether the second base station is located in a coverage of the first relay node; determining, by the first relay node, whether the second base station supports a preset signaling radio bearer measurement under a condition that the second base station is located in the coverage of the first relay node; transmitting, by the first relay node, the updated CSI-RS configuration information to the second base station by using the EN-DC configuration update information under a condition that the second base station supports the preset signaling radio bearer measurement; discarding, by the first relay node, the updated CSI-RS configuration information under a condition that the second base station does not support the preset signaling radio bearer measurement.

In some embodiments, updating, by the second base station, a corresponding neighbor cell list by using the updated CSI-RS configuration information after receiving the EN-DC configuration update information; transmitting, by the second base station, the EN-DC configuration updating confirmation information to the first relay node.

In some embodiments, indicating, by the second base station, a NSA terminal located in a coverage of the second base station to perform the CSI-RS measurement for a cell supporting the CSI-RS measurement among the cells associated with the first base station under a condition that first base station turns on the CSI-RS measurement.

In some embodiments, the transmitting the updated CSI-RS configuration information to a second base station further comprises: transmitting, by the first relay node, the updated CSI-RS configuration information to a second relay node by using the evolved nodeB (eNB) configuration update information under a condition that the second base station is not located in the coverage of the first relay node, wherein the second relay node supports the air interface of the LTE and the second base station is located in the coverage of the second relay node; updating, by the second relay node, the corresponding neighbor list by using the updated CSI-RS configuration information, and transmitting an eNB configuration update confirmation information to the first relay node; determining, by the second relay node, whether the second base station supports the preset signaling radio bearer measurement; transmitting, by the second relay node, the updated CSI-RS configuration information to the second base station by using the EN-DC configuration update information under a condition that the second base station supports the preset signaling radio bearer measurement; discarding, by the second relay node, the updated CSI-RS configuration information under a condition that the second base station does not support the preset signaling radio bearer measurement.

In some embodiments, updating, by the second base station, the corresponding neighbor list by using the updated CSI-RS configuration information; transmitting, by the second base station, an EN-DC configuration updating confirmation information to the second relay node.

In some embodiments, indicating, by the second base station, a NSA terminal located in the coverage of the second base station to perform the CSI-RS measurement for a cell supporting CSI-RS measurement among the cells associated with the first base station under a condition that the first base station turns on the CSI-RS measurement.

According to a second aspect of the embodiments of the present disclosure, there is provided a neighbor cell configuration information transmission system, comprising: a first base station, configured to determine a second base station corresponding to a neighbor cell of a cell whose channel state information reference signal (CSI-RS) configuration is updated according to a neighboring cell relationship under a condition that the CSI-RS configuration for mobility measurement in at least one associated cell is updated, and transmit an updated CSI-RS configuration information to a selected first relay node, wherein the first relay node is associated with modes of the first base station and the second base station, the first base station and the second base station both support an air interface of a New Radio (NR), and no interface for direct communication exists between the first base station and the second base station; the first relay node, configured to transmit the updated CSI-RS configuration information to a second base station; the second base station, configured to indicate a terminal in a coverage of the second base station to measure cells associated with the first base station according to the updated CSI-RS configuration information.

According to a sixth aspect of the embodiments of the present disclosure, there is provided a relay node, including: a processor; and a memory coupled to the processor, storing program instructions which, when executed by the processor, cause the processor to: determine whether a second base station is located in a coverage of the first relay node according to an second base station identifier and an tracking area identifier corresponding to the second base station identifier under a condition that an updated CSI-RS configuration transmitted by a first base station to a second base station is received; transmit the updated CSI-RS configuration information to the second base station under a condition that the second base station is located in the coverage of the first relay node; transmit the updated CSI-RS configuration information to a second relay node connected with the second base station under a condition that the second base station is not located in the coverage of the first relay node, thereby the second relay node transmitting the updated CSI-RS configuration information to a second base station.

In some embodiments, the processor is configured to: transmit the updated CSI-RS configuration information to the second base station by using a downlink RAN configuration transmission information under a condition that the first relay node is a first AMF entity.

In some embodiments, the processor is configured to: transmit the updated CSI-RS configuration information to a second relay node under a condition that the first relay node is a first AMF entity, wherein the second relay node is a second AMF entity connected with the second base station, thereby the second relay node transmitting the updated CSI-RS configuration information to the second base station by using the downlink RAN configuration transmission information.

In some embodiments, the processor is configured to: transmit the updated CSI-RS configuration information to the second base station by using an EN-DC configuration update information under a condition that the second base station supports a preset signaling radio bearer measurement, in a case where the first relay node is a third base station supporting an air interface of the LTE.

In some embodiments, the processor is configured to: transmit the updated CSI-RS configuration information to a second relay node by using an eNB configuration update information under a condition that the first relay node is a third base station supporting an air interface of the LTE, wherein the second relay node supports the air interface of the LTE, and the second base station is located in the coverage of the second relay node, thereby the second relay node transmitting the updated CSI-RS configuration information to the second base station by using an EN-DC configuration update information under a condition that the second base station supports the preset signaling radio bearer measurement.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description with reference to the accompanying drawings, in which:

FIG. 8 is a schematic structural diagram of a first relay node according to one embodiment of the present disclosure.

It should be understood that the dimensions of the various parts shown in the drawings are not drawn to scale. Further, the same or similar reference numerals denote the same or similar component.

DETAILED DESCRIPTION

The technical solutions in the embodiments of the present disclosure will be described clearly and completely with reference to the drawings in the embodiments of the present disclosure, and it is obvious that the embodiments described are only some, rather than all, of the embodiments of the present disclosure. The following description of at least one exemplary embodiment is merely illustrative in nature and is in no way intended to limit the disclosure, its application, or uses. All other embodiments, which can be derived by those skilled in the art from the embodiments disclosed herein without inventiveness, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that, for the convenience of description, the sizes of the respective portions shown in the drawings are not drawn in an actual proportional relationship.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once an item is defined in one figure, it need not be discussed further in subsequent figures.

The inventors have noticed that because the configuration of the CSI-RS information is at least one cell granularity and the CSI-RS information is a time-varying parameter, completely completing the configuration of the CSI-RS information through network management or manually leads to a large optimization workload and is prone to configuration errors. In order to reduce the error probability and improve the network automation degree, some schemes are proposed in the related art for updating based on CSI-RS. But these schemes only support SA (standalone) mode and there is a scenario of an Xn interface. Since there is no interface between base stations in an NSA (Non-Standalone) scenario, these related techniques cannot be applied to the NSA scenario.

Therefore, the present disclosure provides a scheme for an NR base station to automatically acquire CSI-RS configuration information without an inter-base station interface.

Figure 1:
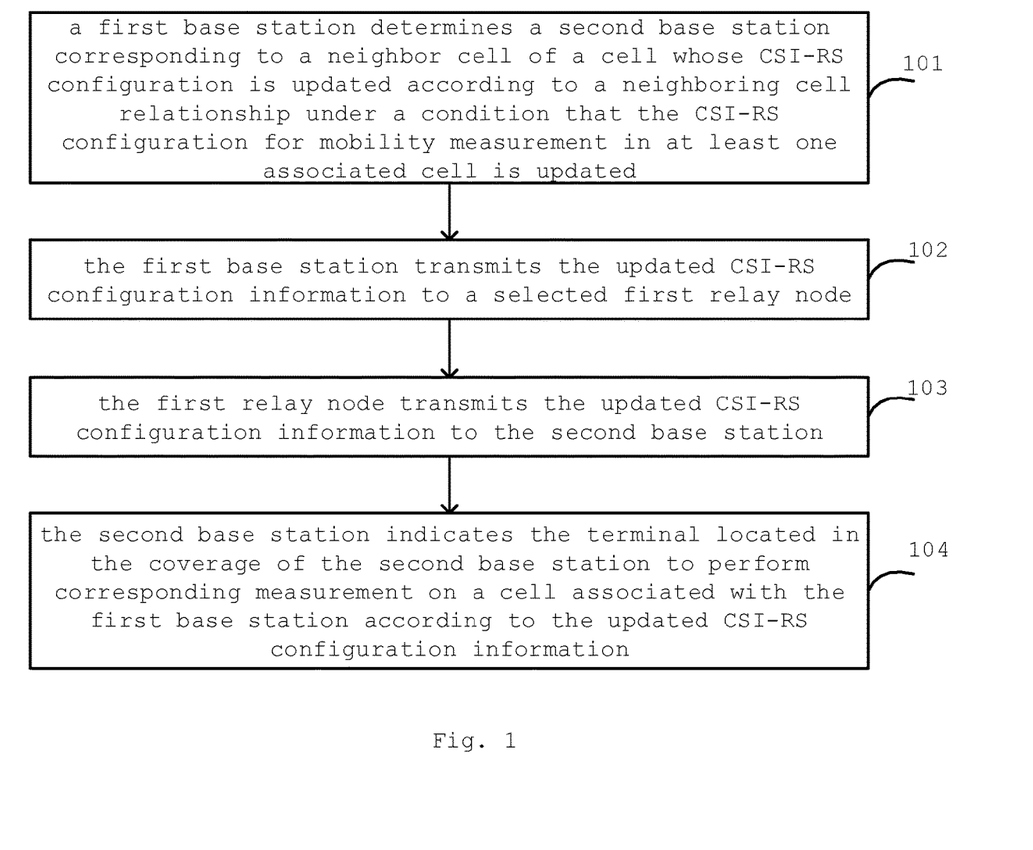
FIG. 1 is a flowchart illustrating a method for transmitting a neighbor cell configuration information according to one embodiment of the present disclosure.

FIG. 1 is a flowchart illustrating a method for transmitting a neighbor cell configuration information according to an embodiment of the present disclosure.

In step 101, a first base station determines a second base station corresponding to a neighbor cell of a cell whose CSI-RS configuration is updated according to a neighboring cell relationship under a condition that the CSI-RS configuration for mobility measurement in at least one associated cell is updated.

It should be noted that, both the first base station and the second base station support NR (New Radio), and there is no interface for direct communication between the first base station and the second base station.

In step 102, the first base station transmits the updated CSI-RS configuration information to a selected first relay node.

In some embodiments, the first relay node is associated with modes of the first base station and the second base station.

For example, the first relay node is a first AMF (Access and Mobility Management Function) entity connected to the first base station under a condition that the first base station and the second base station are both in an SA mode.

For another example, the first relay node is a third base station having a direct communication interface with the first base station under a condition that the first base station is in a NSA mode, and the third base station supports an air interface of the LTE (long term evolution).

In some embodiments, the CSI-RS configuration information comprises at least one of the following:

cell identifier: for example, PCI (Physical Cell Identifier) is used for identification.

indicating information regarding whether to turn off the CSI-RS measurement: 1-bit information may be used, wherein 1 represents the off measurement and 0 is the reserved bit. If the indicating information is not contained, the CSI-RS measurement needs to be continued.

CSI-RS power configuration information: at least including at least one of the following:
  power with respect to PDSCH (Physical Downlink Shared Channel)
  Power offset with respect to SSS (Secondary Synchronization Signal)
  scrambling code number
CSI-RS measurement bandwidth information: at least including at least one of the following:
  measurement bandwidth: for example, 24 PRBs, 48 PRBs, 96 PRBs, 192 PRBs, 264 PRBs
  initial PRB position of CSI-RS
  CSI-RS Density: e.g. 1 or 3
CSI-RS beam configuration: at least including at least one of the following:
  Beam number
  subframe position where the beam exists and its cycle
  CSI-RS Generation sequence number
  initial symbol of CSI-RS in time slot
  frequency-domain pattern of CSI-RS in each PRB In step 103, the first relay node transmits the updated CSI-RS configuration information to the second base station.

In step 104, the second base station indicates the terminal located in the coverage of the second base station to perform corresponding measurement on a cell associated with the first base station according to the updated CSI-RS configuration information.

In the method for transmitting a neighbor cell configuration information provided in the foregoing embodiment of the present disclosure, under a condition that both the first base station and the second base station support the NR but have no interface for direct communication therebetween, the updated CSI-RS configuration information is transmitted from the first base station to the second base station by using the first relay node. The present disclosure can effectively reduce the workload of manual configuration and reduce the possibility of configuration errors. Furthermore, the present disclosure can utilize existing protocol processes without requiring extensive modifications to existing protocols.

Figure 2:
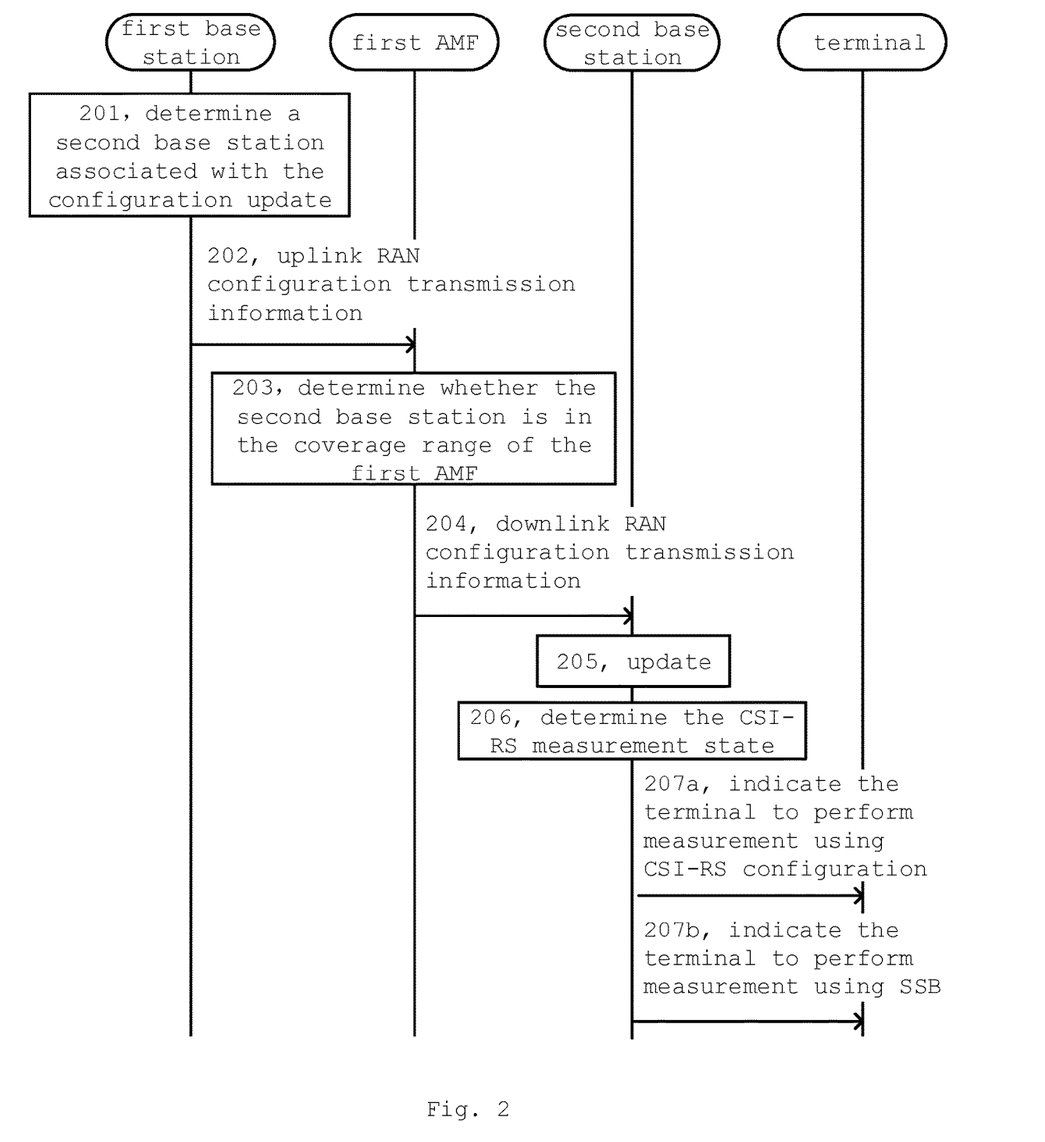
FIG. 2 is a flowchart illustrating a method for transmitting a neighbor cell configuration information according to another embodiment of the present disclosure.

FIG. 2 is a flowchart illustrating a method for transmitting a neighbor cell configuration information according to another embodiment of the disclosure. In the embodiment shown in FIG. 2, the first base station and the second base station both support the NR, and there is no interface for direct communication between the first base station and the second base station, and both the first base station and the second base station are in an SA mode.

In step 201, a first base station determines a second base station corresponding to a neighbor cell of a cell whose CSI-RS configuration is updated according to a neighboring cell relationship under a condition that the CSI-RS configuration for mobility measurement in at least one associated cell is updated.

In step 202, the first base station transmits an Uplink RAN (Radio Access Network) Configuration Transfer information to the first AMF by using an interface (for example, an NG interface) between the first base station and the first AMF. Here, the first AMF connected to the first base station is used as the first relay node.

In some embodiments, at least a first base station identifier and a TAI (Tracking Area identifier) corresponding to the first base station identifier, a second base station identifier and a TAI corresponding to the second base station identifier, and updated CSI-RS Configuration information are included in a SON (Self-Organized Network) Configuration Transfer information element (SON Configuration Transfer IE) of the uplink RAN Configuration Transfer information.

In step 203, the first AMF determines whether the second base station is located in the coverage of the first AMF according to the second base station identifier and the TAI corresponding to the second base station identifier.

In step 204, the first AMF transmits the updated CSI-RS Configuration information to the second base station by using a Downlink RAN Configuration transmission information under a condition that the second base station is located within the coverage of the first AMF.

In step 205, the second base station updates a current CSI-RS configuration information of a cell whose CSI-RS configuration is updated in a neighbor cell list by using the updated CSI-RS configuration information and the first base station identifier.

In some embodiments, the neighbor cell list includes at least one of the following:
  a base station identifier of first base station;
  a cell identifier of the cell whose CSI-RS configuration is updated;
  mode of the first base station: for example, NSA, SA or dual mode;
  indicating information regarding whether a direct connection interface exists with a first base station
  indicating information regarding whether to enable CSI-RS measurement;
  CSI-RS configuration information.

In step 206, the second base station determines whether the CSI-RS measurement is in an on state by using the updated CSI-RS configuration information.

In step 207a, under a condition that the CSI-RS measurement is in an on state, the second base station indicates the terminal within the coverage of the second base station to measure the cell associated with the first base station by using the CSI-RS by using a RRC (Radio Resource Control) reconfiguration information.

In step 207b, under a condition that the CSI-RS measurement is in the off state, the second base station indicates the terminal within the coverage of the second base station to measure the cell associated with the first base station by using the SSB through the RRC reconfiguration information.

Figure 3:
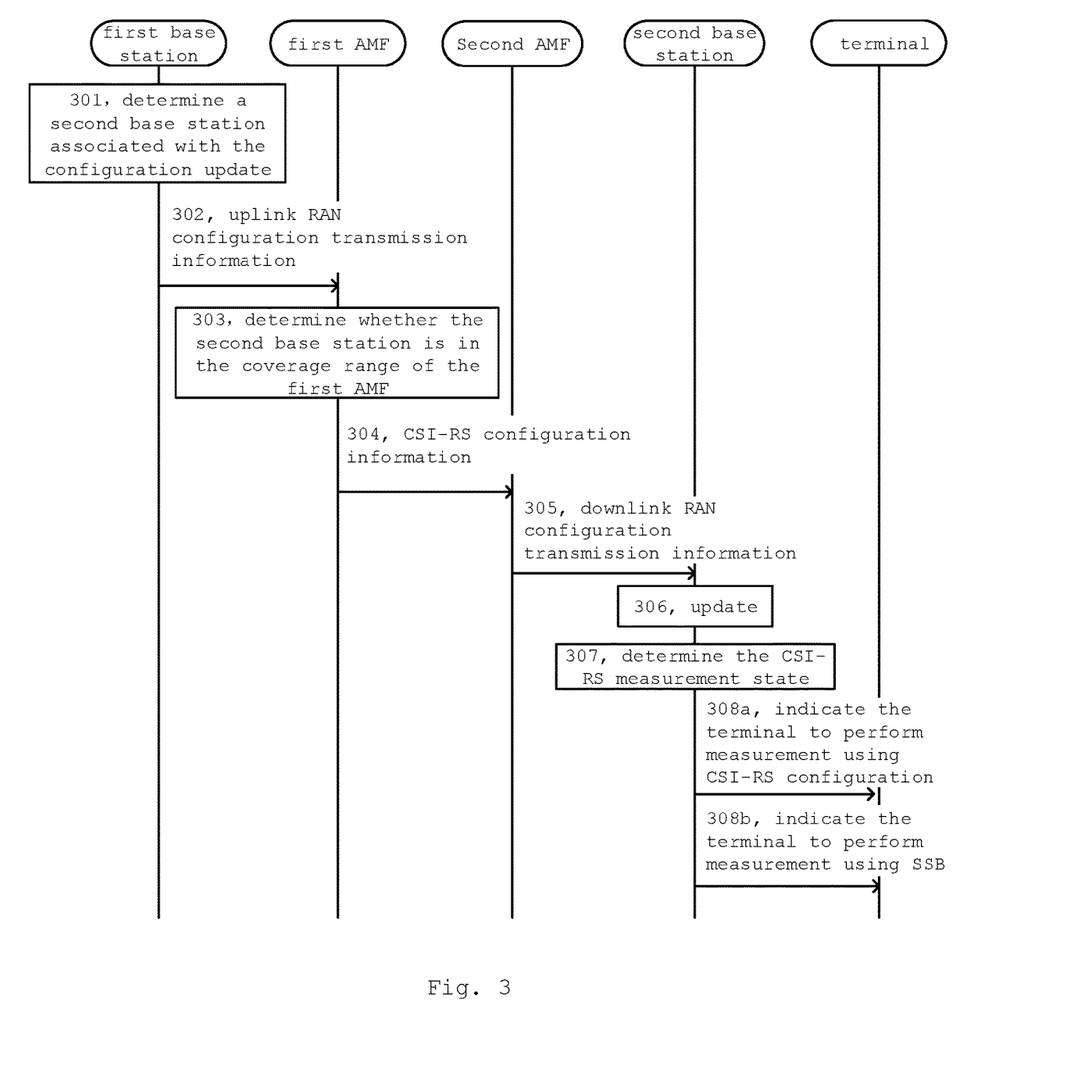
FIG. 3 is a flowchart illustrating a method for transmitting a neighbor cell configuration information according to still another embodiment of the disclosure.

FIG. 3 is a flowchart illustrating a method for transmitting a neighbor cell configuration information according to another embodiment of the disclosure. In the embodiment shown in FIG. 3, the first base station and the second base station both support the NR, and have no interface for direct communication therebetween, and both the first base station and the second base station are in an SA mode.

In step 301, a first base station determines a second base station corresponding to a neighbor cell of a cell whose CSI-RS configuration is updated according to a neighboring cell relationship under a condition that the CSI-RS configuration for mobility measurement in at least one associated cell is updated.

At step 302, the first base station transmits a uplink RAN configuration transfer information to the first AMF using an interface (e.g., an NG interface) between the first base station and the first AMF. Here, the first AMF connected to the first base station is used as the first relay node.

In some embodiments, at least the first base station identifier and the TAI associated with the first base station identifier, the second base station identifier and the TAI associated with the second base station identifier, and the updated CSI-RS configuration information are included in a SON configuration transmission information element of the uplink RAN configuration transmission information.

In step 303, the first AMF determines whether the second base station is located within the coverage of the first AMF according to the second base station identifier and the TAI associated with the second base station identifier.

In step 304, the first AMF transmits the updated CSI-RS configuration information to the second AMF according to the TAI associated with the second base station identifier under a condition that the second base station is not located in the coverage of the first AMF. Here, the second AMF connected to the second base station is used as the second relay node.

In step 305, the second AMF transmits the updated CSI-RS configuration information to the second base station by using the downlink RAN configuration transmission information.

In step 306, the second base station updates a current CSI-RS configuration information of a cell whose CSI-RS configuration is updated in a neighbor cell list by using the updated CSI-RS configuration information and the first base station identifier.

In step 307, the second base station determines whether the CSI-RS measurement is in an on state by using the updated CSI-RS configuration information.

In step 308a, under a condition that the CSI-RS measurement is in the on state, the second base station indicates, by means of the RRC reconfiguration information, the terminal within the coverage of the second base station to measure the cell associated with the first base station by using the CSI-RS.

In step 308b, under a condition that the CSI-RS measurement is in the off state, the second base station indicates, by means of the RRC reconfiguration information, the terminal within the coverage of the second base station to measure the cell associated with the first base station by using the SSB.

Figure 4:
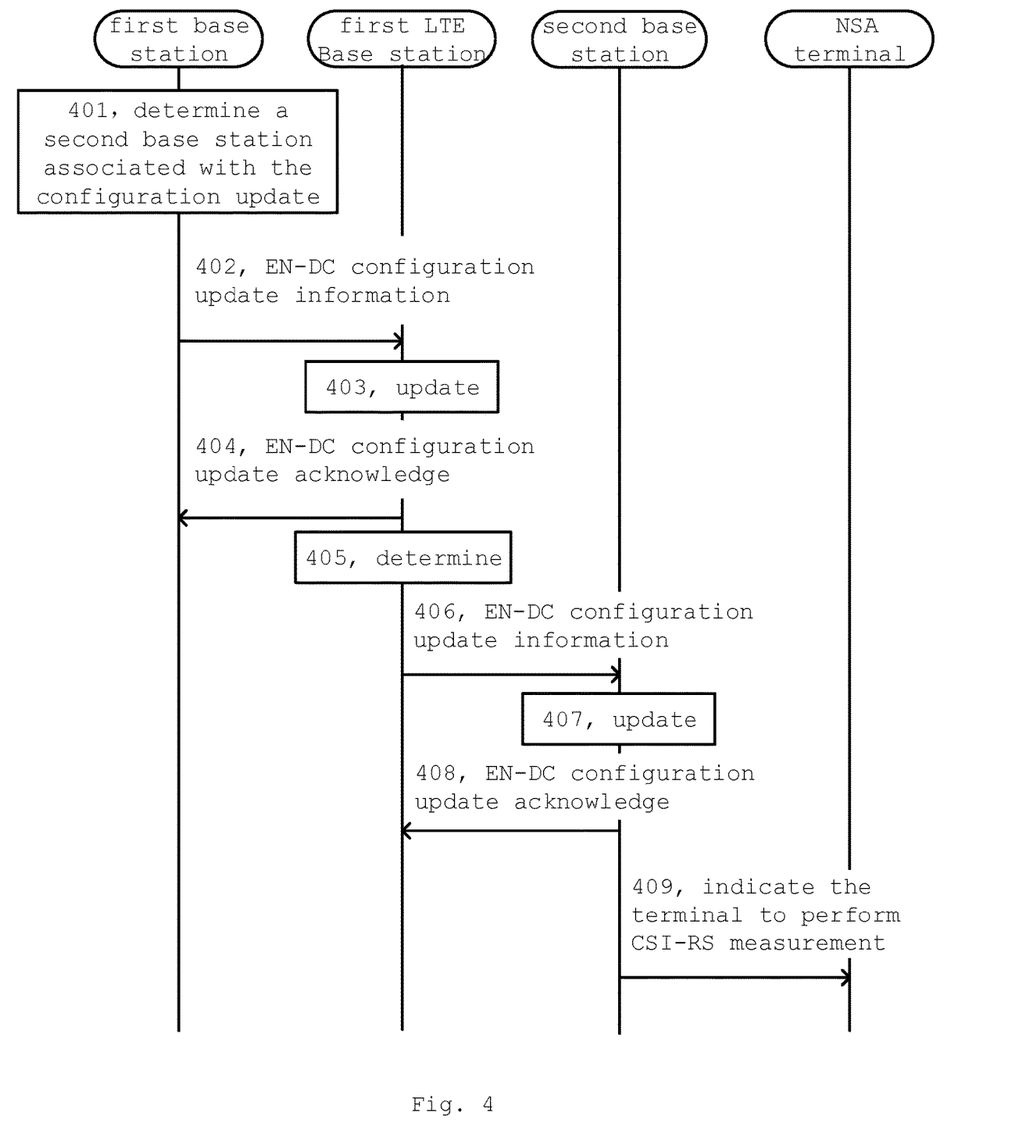
FIG. 4 is a flowchart illustrating a method for transmitting neighbor cell configuration information according to another embodiment of the disclosure.

FIG. 4 is a flowchart illustrating a method for transmitting a neighbor cell configuration information according to another embodiment of the disclosure. In the embodiment shown in FIG. 4, the first base station and the second base station both support the NR, and there is no interface for direct communication between them, and the first base station is in the NSA mode.

In step 401, a first base station determines a second base station corresponding to a neighbor cell of a cell whose CSI-RS configuration is updated according to a neighboring cell relationship under a condition that the CSI-RS configuration for mobility measurement in at least one associated cell is updated.

In step 402, the first base station transmits the updated CSI-RS Configuration information to the first LTE base station by using the EN-DC (EUTRAN-NR DC) configuration update information. Here, the first LTE base station having a direct communication interface connection with the first base station is used as the first relay node.

In step 403, the first LTE base station updates the corresponding neighbor list with the updated CSI-RS configuration information.

In step 404, the first LTE base station sends an EN-DC Configuration update ACK (acknowledgement) information to the first base station.

In step 405, the first LTE base station determines whether the second base station is located within the coverage of the first LTE base station. If the second base station is located in the coverage of the first LTE base station, the first LTE base station further determines whether the second base station supports the preset signaling radio bearer measurement according to network management configuration.

In some embodiments, the preset signaling radio bearer measurement is SRB (signaling Radio Bearer) 3.

In step 406, under a condition that the second base station supports the preset signaling radio bearer measurement, the first LTE base station transmits the updated CSI-RS configuration information to the second base station by means of the EN-DC configuration update information.

In some embodiments, under a condition that the second base station does not support the preset signaling radio bearer measurement, the first LTE base station discards the updated CSI-RS configuration information and does not perform the subsequent processing.

In step 407, the second base station updates the corresponding neighbor cell list by using the updated CSI-RS configuration information after receiving the EN-DC configuration update information.

In step 408, the second base station transmits an EN-DC configuration update acknowledge message to the first LTE base station.

In step 409, under a condition that the first base station starts CSI-RS measurement, the second base station indicates the NSA terminal located within the coverage of the second base station to perform CSI-RS measurement for a cell supporting CSI-RS measurement among cells associated with the first base station.

Figure 5:
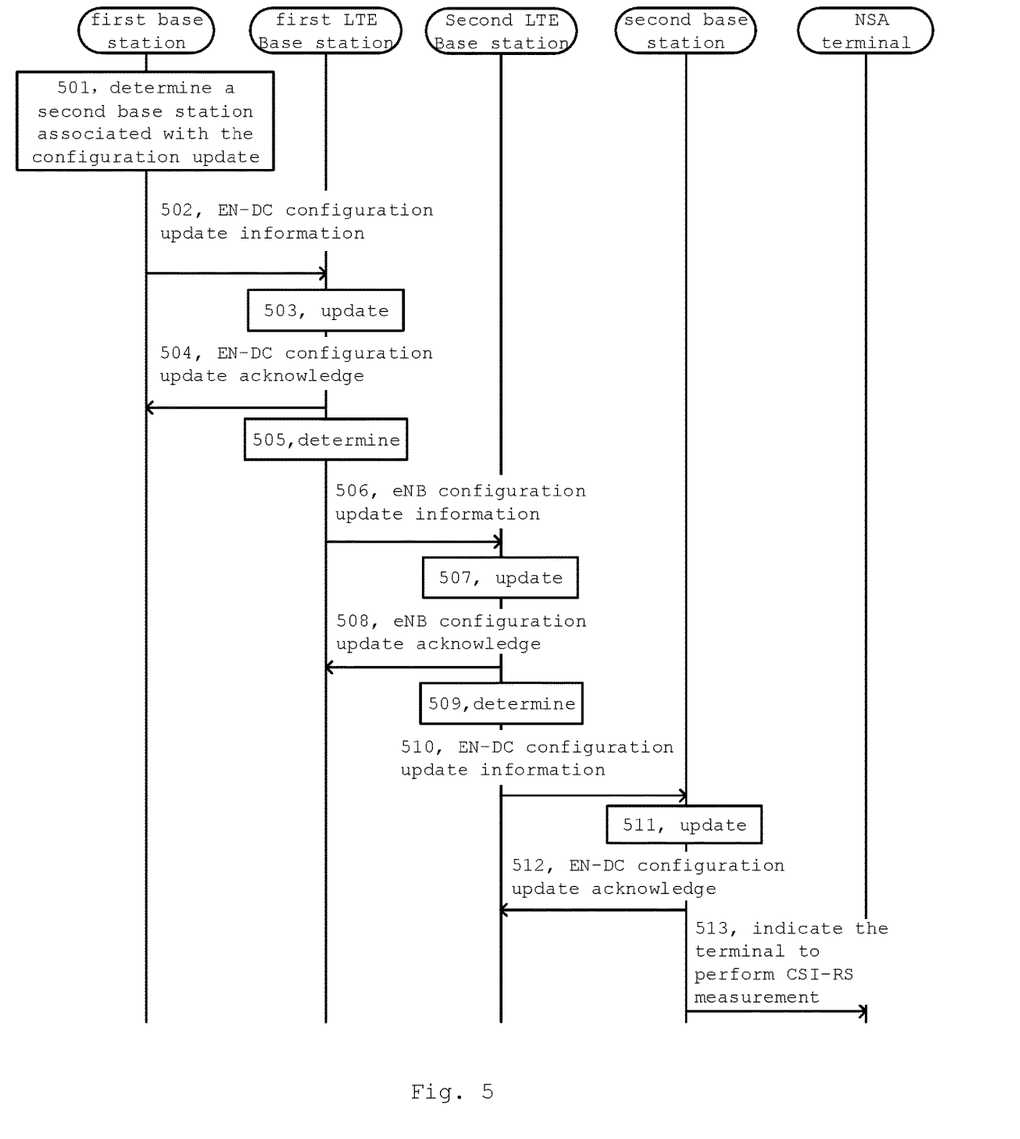
FIG. 5 is a flowchart illustrating a method for transmitting a neighbor cell configuration information according to still another embodiment of the disclosure.

FIG. 5 is a flowchart illustrating a method for transmitting neighbor cell configuration information according to another embodiment of the disclosure. In the embodiment shown in FIG. 5, the first base station and the second base station both support the NR, and there is no interface for direct communication between them, and the first base station is in the NSA mode.

In step 501, a first base station determines a second base station corresponding to a neighbor cell of a cell whose CSI-RS configuration is updated according to a neighboring cell relationship under a condition that the CSI-RS configuration for mobility measurement in at least one associated cell is updated.

In step 502, the first base station transmits the updated CSI-RS Configuration information to the first LTE base station by using the EN-DC configuration update information. Here, the first LTE base station having a direct communication interface connection with the first base station is used as the first relay node.

In step 503, the first LTE base station updates the corresponding neighbor cell list with the updated CSI-RS configuration information.

In step 504, the first LTE base station transmits an EN-DC configuration update acknowledge message to the first base station.

In step 505, the first LTE base station determines whether the second base station is located within the coverage of the first LTE base station.

In step 506, under a condition that the second base station is not located in the coverage of the first relay node, the first relay node transmits the updated CSI-RS configuration information to the second LTE base station through an eNB (Evolved NodeB) configuration update information. Here, the second LTE base station having a direct communication interface with the second base station is used as the second relay node. The second relay node supports an air interface of the LTE, and the second base station is located in the coverage range of the second relay node.

In step 507, the second LTE base station updates the corresponding neighbor cell list with the updated CSI-RS configuration information.

In step 508, the second LTE base station transmits the eNB configuration update confirmation information to the first LTE base station.

In step 509, the second LTE base station determines whether the second base station supports the preset signaling radio bearer measurement according to the network management configuration.

In some embodiments, the preset signaling radio bearer measurement is SRB3.

In step 510, under a condition that the second base station supports the predetermined signaling radio bearer measurement, the second LTE base station transmits the updated CSI-RS configuration information to the second base station through the EN-DC configuration update information.

In some embodiments, under a condition that the second base station does not support the predetermined signaling radio bearer measurement, the second LTE base station discards the updated CSI-RS configuration information and does not perform the subsequent processing.

In step 511, the second base station updates the corresponding neighbor cell list by using the updated CSI-RS configuration information after receiving the EN-DC configuration update information.

In step 512, the second base station transmits an EN-DC configuration update confirmation information to the second LTE base station.

In step 513, under a condition that the first base station starts CSI-RS measurement, the second base station indicates the NSA terminal within the coverage of the second base station to perform CSI-RS measurement for a cell supporting CSI-RS measurement among cells associated with the first base station.

Figure 6:
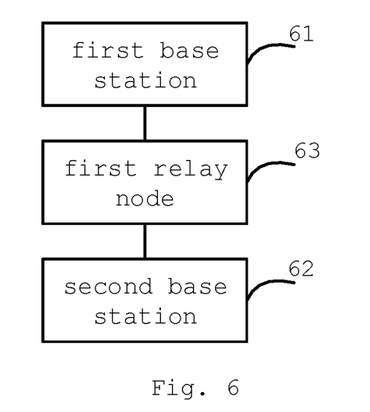
FIG. 6 is a schematic structural diagram of a system of transmitting a neighbor cell configuration information according to an embodiment of the present disclosure.

FIG. 6 is a schematic structural diagram of a neighbor cell configuration information transmission system according to an embodiment of the present disclosure. As shown in FIG. 6, the system includes a first base station 61, a second base station 62, and a first relay node 63. The first base station 61 and the second base station 62 both support the NR, and there is no interface for direct communication between the first base station 61 and the second base station 62.

The first base station 61 determines a second base station 62 corresponding to a neighbor cell of a cell whose CSI-RS configuration is updated according to a neighboring cell relationship under a condition that the CSI-RS configuration for mobility measurement in at least one associated cell is updated. The first base station 61 transmits the updated CSI-RS configuration information to the selected first relay node 63.

In some embodiments, the first relay node 63 is associated with modes of the first base station 61 and the second base station 62.

For example, the first relay node 63 is a first AMF entity connected to the first base station 61 under a condition that the first base station 61 and the second base station 62 are both in an SA mode.

For another example, the first relay node 63 is a third base station having a direct communication interface with the first base station 61 under a condition that the first base station 61 is in a NSA mode, wherein the third base station supports an air interface of the LTE.

In some embodiments, the CSI-RS configuration information comprises at least one of the following:
cell identifier: for example, PCI (Physical Cell Identifier) is used for identification.
indicating information regarding whether to turn off the CSI-RS measurement: 1-bit information may be used, wherein 1 represents the off measurement and 0 is the reserved bit. If the indicating information is not contained, the CSI-RS measurement needs to be continued.

CSI-RS power configuration information: at least including at least one of the following:
power with respect to PDSCH (Physical Downlink Shared Channel)
Power offset with respect to SSS (Secondary Synchronization Signal)
scrambling code number CSI-RS measurement bandwidth information: at least including at least one of the following:
measurement bandwidth: for example, 24 PRBs, 48 PRBs, 96 PRBs, 192 PRBs, 264 PRBs
initial PRB position of CSI-RS
CSI-RS Density: e.g. 1 or 3

CSI-RS beam configuration: at least including at least one of the following:
Beam number
subframe position where the beam exists and its cycle
CSI-RS Generation sequence number
initial symbol of CSI-RS in time slot
frequency-domain pattern of CSI-RS in each PRB The first relay node 63 transmits the updated CSI-RS configuration information to the second base station 62. The second base station 62 indicates the terminal in the coverage of the second base station 62 to perform corresponding measurements on the cell associated with the first base station 61 according to the updated CSI-RS configuration information.

In some embodiments, under a condition that the first base station 61 and the second base station 62 are both in the SA mode, and the first AMF connected to the first base station 61 is used as the first relay node 63, the first base station 611 transmits the uplink RAN configuration transmission information to the first relay node 63 using an interface (for example, an NG interface) between the first base station and the first relay node 63.

For example, the SON configuration transmission information element in the uplink RAN configuration transmission information contains a first base station identifier and a tracking area identifier corresponding to the first base station identifier, a second base station identifier and a tracking area identifier corresponding to the second base station identifier, and updated CSI-RS configuration information.

The first relay node 63 determines whether the second base station 62 is located within the coverage of the first relay node 63 according to the second base station identifier and the tracking area identifier corresponding to the second base station identifier. Under a condition that the second base station 62 is located within the coverage of the first relay node 63, the first relay node 63 transmits the updated CSI-RS configuration information to the second base station 62 by using the downlink RAN configuration transmission information.

The second base station 62 updates a current CSI-RS configuration information of a cell whose CSI-RS configuration is updated in a neighbor cell list by using the updated CSI-RS configuration information and the first base station identifier.

In some embodiments, the neighbor cell list includes at least one of a first base station identifier, a cell identifier of a cell whose CSI-RS configuration is updated, a mode of the first base station, an indicating information of whether a direct connection interface exists with the first base station, an indicating information of whether to enable CSI-RS measurement, and a CSI-RS configuration information.

In some embodiments, the second base station 62 determines whether the CSI-RS measurement is in an on state by using the updated CSI-RS configuration information. Under a condition that the CSI-RS measurement is in the on state, the second base station 62 indicates, through the RRC reconfiguration information, the terminal within the coverage of the second base station 62 to measure the cell associated with the first base station by using the CSI-RS. Under a condition that the CSI-RS measurement is in the off state, the second base station 62 indicates, through the RRC reconfiguration information, the terminal within the coverage of the second base station 62 to measure the cell associated with the first base station by using the SSB.

Figure 7:
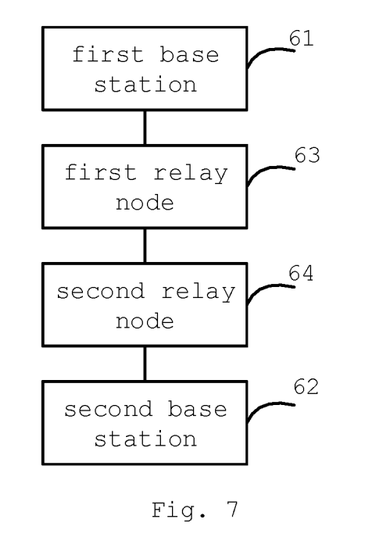
FIG. 7 is a schematic structural diagram of a system of transmitting a neighbor cell configuration information according to another embodiment of the present disclosure.

FIG. 7 is a schematic structural diagram of a neighboring cell configuration information transmission system according to another embodiment of the present disclosure.

FIG. 7 differs from FIG. 6 in that, in the embodiment shown in FIG. 7, the first relay node 63 is further configured to send the updated CSI-RS configuration information to the second relay node 64 under a condition that the second base station 62 is not located in the coverage of the first relay node 63. The second relay node 64 is a second AMF connected to the second base station 62. The second relay node 64 transmits the updated CSI-RS configuration information to the second base station using the downlink RAN configuration transmission information.

In some embodiments, as shown in FIG. 6, when the first base station 61 is in the NSA mode, a third base station having a direct communication interface connection with the first base station 61 is used as the first relay node 63, where the third base station supports an LTE air interface.

The first base station 61 transmits the updated CSI-RS configuration information to the first relay node 63 through the EN-DC configuration update information. The first relay node 63 updates the corresponding neighbor cell list by using the updated CSI-RS configuration information, and sends an EN-DC configuration update acknowledge message to the first base station 61. The first relay node 63 determines whether the second base station 62 is within the coverage of the first relay node 63. Under a condition that the second base station 62 is located in the coverage of the first relay node 63, the first relay node 63 determines whether the second base station 62 supports the preset signaling radio bearer measurement, and under a condition that the second base station 62 supports the preset signaling radio bearer measurement, the first relay node 63 transmits the updated CSI-RS configuration information to the second base station 62 through the EN-DC configuration update information.

In some embodiments, the preset signaling radio bearer measurement is SRB3.

After receiving the EN-DC configuration update information, the second base station 62 updates the corresponding neighbor cell list by using the updated CSI-RS configuration information, and transmits an EN-DC configuration update acknowledge message to the first relay node 63. The second base station 62 indicates the NSA terminal within the coverage of the second base station 62 to perform CSI-RS measurement for a cell supporting CSI-RS measurement among cells associated with the first base station under a condition that the first base station starts CSI-RS measurement.

In some embodiments, the first relay node 63 discards the updated CSI-RS configuration information under a condition that the second base station 62 does not support the preset signaling radio bearer measurement.

In some embodiments, the first relay node 63 transmits the updated CSI-RS configuration information to the second relay node 64 through the eNB configuration update information under a condition that the second base station 62 is not located in the coverage of the first relay node 63, as shown in FIG. 7. The second relay node 64 supports LTE air interfaces, and the second base station 62 is located within the coverage of the second relay node 64.

The second relay node 64 updates the corresponding neighbor cell list by using the updated CSI-RS configuration information, and transmits an eNB configuration update acknowledge information to the first relay node. The second relay node 64 determines whether the second base station 62 supports the preset signaling radio bearer measurement, and if the second base station 62 supports the preset signaling radio bearer measurement, the second relay node 64 transmits the updated CSI-RS configuration information to the second base station 62 through the EN-DC configuration update information.

The second base station 62 updates the corresponding neighbor cell list by using the updated CSI-RS configuration information, and transmits an EN-DC configuration update acknowledge message to the second relay node 64. The second base station 62 indicates the NSA terminal in the coverage of the second base station 62 to perform CSI-RS measurement for a cell supporting CSI-RS measurement among cells associated with the first base station under a condition that the first base station 61 starts CSI-RS measurement.

In some embodiments, the second relay node 64 discards the updated CSI-RS configuration information under a condition that the second base station 62 does not support the preset signaling radio bearer measurement.

The present disclosure also provides a computer-readable storage medium. The computer readable storage medium stores computer instructions which, when executed by the processor, implement the method according to any one of FIGS. 1 to 5.

FIG. 8 is a schematic structural diagram of a first relay node according to one embodiment of the present disclosure.

As shown in FIG. 8, A first relay node comprises a processor 81 and a memory 82 coupled to the processor 82, storing program instructions which, when executed by the processor 81, cause the processor 81 to: determine whether a second base station is located in a coverage of the first relay node according to an second base station identifier and an tracking area identifier corresponding to the second base station identifier under a condition that an updated CSI-RS configuration transmitted by a first base station to a second base station is received, transmit the updated CSI-RS configuration information to the second base station under a condition that the second base station is located in the coverage of the first relay node, transmit the updated CSI-RS configuration information to a second relay node connected with the second base station under a condition that the second base station is not located in the coverage of the first relay node, thereby the second relay node transmitting the updated CSI-RS configuration information to a second base station.

In some embodiments, the processor 81 is configured to: transmit the updated CSI-RS configuration information to the second base station by using a downlink RAN configuration transmission information under a condition that the first relay node is a first AMF entity.

In some embodiments, the processor 81 is configured to: transmit the updated CSI-RS configuration information to a second relay node under a condition that the first relay node is a first AMF entity, wherein the second relay node is a second AMF entity connected with the second base station, thereby the second relay node transmitting the updated CSI-RS configuration information to the second base station by using the downlink RAN configuration transmission information.

In some embodiments, the processor 81 is configured to: transmit the updated CSI-RS configuration information to the second base station by using an EN-DC configuration update information under a condition that the second base station supports a preset signaling radio bearer measurement, in a case where the first relay node is a third base station supporting an air interface of the LTE.

In some embodiments, the processor 81 is configured to: transmit the updated CSI-RS configuration information to a second relay node by using an eNB configuration update information under a condition that the first relay node is a third base station supporting an air interface of the LTE, wherein the second relay node supports the air interface of the LTE, and the second base station is located in the coverage of the second relay node, thereby the second relay node transmitting the updated CSI-RS configuration information to the second base station by using an EN-DC configuration update information under a condition that the second base station supports the preset signaling radio bearer measurement.

The present disclosure is illustrated by the following specific examples.

Embodiment 1

In an EN-DC scenario, there are two NR base stations within the coverage of LTE base station 1, which are NR base station 1 and NR base station 2, respectively. The NR base station 1 and NR base station 2 are configured with CSI-RS configuration information for mobility measurement. The NSA terminal 1 is located within the coverage of the NR base station 2. This embodiment describes a process in which the NR base station 2 configures CSI-RS measurement for the NSA terminal 1 after the CSI-RS configuration of the NR base station 1 is updated.

Step 1: the NR base station 1 updates CSI-RS configuration information. Since the NR base station 1 and the peripheral NR base stations do not have a direct connection interface and the NR base station 1 is in a NSA mode, the NR base station 1 transmits the updated CSI-RS configuration information to the LTE base station 1 by using an EN-DC configuration update information.

Step 2: after receiving the EN-DC configuration update information, the LTE base station 1 stores the CSI-RS configuration information of the relevant cells in the NR base station 1.

Step 3: the LTE base station 1 transmits an EN-DC configuration update acknowledge message to the NR base station 1.

Step 4: since the NR base station 2 supports SRB3, the LTE base station 1 transmits the updated CSI-RS configuration information of the NR base station 1 to the NR base station 2 through the EN-DC configuration update information.

Step 5: the NR base station 2 saves the updated CSI-RS configuration information of the base station 1, and transmits the updated CSI-RS configuration information of the NR base station 1 to the NR base station 1 by using the EN-DC configuration update confirm message.

Step 6: the NR base station 1 performs CSI-RS measurement configuration for the NSA terminal 1, wherein the measurement configuration includes identifiers of cells related to the NR base station 1 and the NR base station 2 and configuration information of the CSI-RS.

Step 7: the NSA terminal 1 transmits the measurement result on the NR base station 1 to the NR base station 2 by using the SRB3 according to the measurement result.

Embodiment 2 in an EN-DC scenario, there is an NR base station 1 in the coverage of the LTE base station 1, and an NR base station 2 in the coverage of the LTE base station 2. The NR base station 1 and the NR base station 2 are configured with CSI-RS configuration information for mobility measurements. The NSA terminal 1 is located within the coverage of the NR base station 2. This embodiment describes a process in which the NR base station 2 configures CSI-RS measurement for the NSA terminal 1 after the CSI-RS configuration of the NR base station 1 is updated.

Step 1: the NR base station 1 updates a CSI-RS configuration information. The NR base station 1 and peripheral NR base stations do not have direct connection interfaces, and the NR base station 1 is in an NSA mode, and the NR base station 1 transmits an updated CSI-RS configuration information to the LTE base station 1 by using an EN-DC configuration updating message.

Step 2: after receiving the EN-DC configuration updating message, the LTE base station 1 stores the CSI-RS configuration information of the relevant cells in the NR base station 1.

Step 3: the LTE base station 1 transmits an EN-DC configuration update acknowledge message to the NR base station 1.

Step 4: the LTE base station 1 transmits the updated CSI-RS configuration information to the LTE base station 2 through an eNB configuration updating message.

Step 5: the LTE base station 2 saves the CSI-RS configuration of the NR base station 1 and transmits an eNB configuration update acknowledge message to the LTE base station 1.

Step 6: since the NR base station 2 supports SRB3, the LTE base station 2 transmits the updated CSI-RS configuration information of the NR base station 1 to the NR base station 2 by means of the EN-DC configuration updating message.

Step 7: the NR base station 2 saves CSI-RS configuration information of the NR base station 1, and transmits an EN-DC configuration update acknowledge message to the LTE base station 2.

Step 8: the NR base station 2 performs CSI-RS measurement configuration for the NSA terminal 1, wherein the measurement configuration includes identifiers of cells related to the NR base station 1 and the NR base station 2 and CSI-RS configuration information.

Step 9: according to the measurement results, the NSA terminal 1 transmits the measurement result regarding the NR base station 1 to the NR base station 2 by using the SRB3.

Embodiment 3

In the SA scenario, there is no Xn interface between NR base station 1 and NR base station 2, and NR base station 1 and NR base station 2 are connected by AMF, respectively. The CSI-RS measurement configuration of the NR base station 1 has been turned off for energy-saving reasons, and the NR base station 1 triggers CSI-RS configuration updating, and informs the NR base station 2 of changing strategies through AMF. The NR base station 2, after receiving the notification, adopts the SSB-based measurement scheme for all users.

Step 1: the NR base station 1 turns off the CSI-RS transmission and updates CSI-RS configuration information because there is no terminal connected in the coverage area. The NR base station 1 selects an AMF as a relay node because there is no direct connection interface between the NR base station 1 and the peripheral NR base stations and the NR base station 1 is in an SA mode.

Step 2: the NR base station 1 transmits an uplink RAN configuration transfer information to the AMF connected to the NR base station 1 using an NG interface, wherein the following information is included:
base station identifier and TAI of NR base station 1
base station identifier and TAI of NR base station 2
CSI-RS configuration information: cell identifier Step 3: after receiving the uplink RAN configuration transmission information, the AMF determines that the base station 2 is located within the coverage of the AMF according to the TAI of the NR base station 2. The AMF transmits an downlink RAN configuration transfer information to the NR base station 2, so as to send CSI-RS configuration information to the NR base station 2.

Step 4: the NR base station 2 saves the CSI-RS configuration information. Since the CSI-RS configuration information only includes a cell identifier, the NR base station 2 deletes the CSI-RS configuration information of the cell related to the NR base station 1.

Step 5: the NR base station 2 triggers the terminals 1 within its coverage to make relevant measurements on the NR base station 1 by using the SSB.

In some embodiments, the functional unit modules described above can be implemented as a general purpose Processor, a Programmable Logic Controller (PLC), a Digital Signal Processor (Digital Signal Processor, DSP), an Application Specific Integrated Circuit (ASIC), a Field Programmable Gate Array (FPGA) or other Programmable Logic device, discrete Gate or transistor Logic, discrete hardware components, or any suitable combination thereof for performing the functions described in this disclosure.

It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

Although some specific embodiments of the present disclosure have been described in detail by way of example, it should be understood by those skilled in the art that the above examples are for illustration only and are not intended to limit the scope of the present disclosure. It will be understood by those skilled in the art that various changes may be made and equivalents may be substituted for elements thereof without departing from the scope and spirit of the present disclosure. The scope of the present disclosure is defined by the appended claims.

What is claimed is:

1. A method for transmitting a neighbor cell configuration information, comprising:
determining, by a first base station, a second base station corresponding to a neighbor cell of a cell whose channel state information reference signal (CSI-RS) configuration is updated according to a neighboring cell relationship under a condition that the CSI-RS configuration for mobility measurement in at least one associated cell is updated, wherein the first base station and the second base station both support an air interface of a New Radio (NR), and no interface for direct communication exists between the first base station and the second base station;
transmitting, by the first base station, an updated CSI-RS configuration information to a selected first relay node, wherein the first relay node is associated with modes of the first base station and the second base station, and the first relay node is a third base station having a direct communication interface with the first base station under a condition that the first base station is in a non-standalone (NSA) mode, wherein the third base station supports an air interface of long term evolution (LTE), the transmitting, by the first base station, the updated CSI-RS configuration information to the first relay node comprising:
transmitting, by the first base station, the updated CSI-RS configuration information to a first relay node by using an EUTRA-NR dual connection (EN-DC) configuration update information; and
updating, by the first relay node, the neighbor cell list by using the updated CSI-RS configuration information, and transmitting an EN-DC configuration update confirmation information to the first base station;
transmitting, by the first relay node, the updated CSI-RS configuration information to a second base station, comprising:
determining, by the first relay node, whether the second base station is located in a coverage of the first relay node;
determining, by the first relay node, whether the second base station supports a preset signaling radio bearer measurement under a condition that the second base station is located in the coverage of the first relay node;
transmitting, by the first relay node, the updated CSI-RS configuration information to the second base station by using the EN-DC configuration update information under a condition that the second base station supports the preset signaling radio bearer measurement; and
discarding, by the first relay node, the updated CSI-RS configuration information under a condition that the second base station does not support the preset signaling radio bearer measurement; and
indicating, by the second base station, a terminal in a coverage of the second base station to measure cells associated with the first base station according to the updated CSI-RS configuration information.

2. The method according to claim 1, wherein the first relay node is a first access and mobility management function (AMF) entity connected to the first base station under a condition that the first base station and the second base station are both in an standalone (SA) mode.

3. The method according to claim 2, wherein the transmitting the updated CSI-RS configuration information to the selected first relay node comprises:
 transmitting, by the first base station, an uplink Radio Access Network (RAN) configuration transmission information to the first relay node by using an interface between the first base station and the first relay node, wherein the uplink RAN configuration transmission information comprises a first base station identifier, a tracking area identifier corresponding to the first base station identifier, a second base station identifier and a tracking area identifier corresponding to the second base station identifier and the updated CSI-RS configuration information.

4. The method according to claim 3, wherein the transmitting the updated CSI-RS configuration information to the second base station comprises:
 determining, by the first relay node, whether the second base station is located in a coverage of the first relay node according to the second base station identifier and the tracking area identifier corresponding to the second base station identifier;
 transmitting, by the first relay node, the updated CSI-RS configuration information to the second base station by using a downlink RAN configuration transmission information under a condition that the second base station is located in the coverage of the first relay node;
 transmitting, by the first relay node, the updated CSI-RS configuration information to a second relay node under a condition that the second base station is not located in the coverage of the first relay node, wherein the second relay node is a second AMF entity connected with the second base station; and
 transmitting, by the second relay node, the updated CSI-RS configuration information to a second base station by using the downlink RAN configuration transmission information.

5. The method according to claim 4, further comprising:
 updating, by the second base station, a current CSI-RS configuration information of a cell whose CSI-RS configuration is updated in a neighbor cell list by using the updated CSI-RS configuration information and the first base station identifier.

6. The method according to claim 5, further comprising:
 determining, by the second base station, whether the CSI-RS measurement is in an on state by using the updated CSI-RS configuration information;
 indicating, by the second base station, the terminal to measure the cell associated with the first base station according to the CSI-RS measurement by using a Radio Resource Control (RRC) reconfiguration information under a condition that the CSI-RS measurement is in an on state; and
 indicating, by the second base station, the terminal to measure the cell associated with the first base station by using a synchronization signal block (SSB) by using the RRC reconfiguration information under a condition that the CSI-RS measurement is in an off state.

7. The method according to claim 1, further comprising:
 updating, by the second base station, a corresponding neighbor cell list by using the updated CSI-RS configuration information after receiving the EN-DC configuration update information; and
 transmitting, by the second base station, the EN-DC configuration updating confirmation information to the first relay node.

8. The method according to claim 7, further comprising:
 indicating, by the second base station, a NSA terminal located in a coverage of the second base station to perform the CSI-RS measurement for a cell supporting the CSI-RS measurement among the cells associated with the first base station under a condition that first base station turns on the CSI-RS measurement.

9. The method according to claim 1, wherein the transmitting the updated CSI-RS configuration information to a second base station further comprises:
 transmitting, by the first relay node, the updated CSI-RS configuration information to a second relay node by using the evolved nodeB (eNB) configuration update information under a condition that the second base station is not located in the coverage of the first relay node, wherein the second relay node supports the air interface of LTE and the second base station is located in the coverage of the second relay node;
 updating, by the second relay node, the corresponding neighbor list by using the updated CSI-RS configuration information, and transmitting an eNB configuration update confirmation information to the first relay node;
 determining, by the second relay node, whether the second base station supports the preset signaling radio bearer measurement;
 transmitting, by the second relay node, the updated CSI-RS configuration information to the second base station by using the EN-DC configuration update information under a condition that the second base station supports the preset signaling radio bearer measurement; and
 discarding, by the second relay node, the updated CSI-RS configuration information under a condition that the second base station does not support the preset signaling radio bearer measurement.

10. The method according to claim 9, further comprising:
 updating, by the second base station, the corresponding neighbor list by using the updated CSI-RS configuration information; and
 transmitting, by the second base station, an EN-DC configuration updating confirmation information to the second relay node.

11. The method according to claim 10, further comprising:
 indicating, by the second base station, a NSA terminal located in the coverage of the second base station to perform the CSI-RS measurement for a cell supporting CSI-RS measurement among the cells associated with the first base station under a condition that the first base station turns on the CSI-RS measurement.

12. A system for transmitting a neighbor cell configuration information, comprising:
 a first base station, configured to determine a second base station corresponding to a neighbor cell of a cell whose channel state information reference signal (CSI-RS) configuration is updated according to a neighboring cell relationship under a condition that the CSI-RS configuration for mobility measurement in at least one associated cell is updated, and transmit the updated CSI-RS configuration information to a first relay node by using an EUTRA-NR dual connection (EN-DC) configuration update information, wherein the first relay node is associated with modes of the first base station and the second base station, the first relay node is a third base station having a direct communication interface with the first base station under a condition that the first base station is in a non-standalone (NSA) mode, wherein the third base station supports an air interface of long term evolution (LTE), the first base station and the second base station both support an air interface of a New Radio (NR), and no interface for direct communication exists between the first base station and the second base station;

the first relay node, configured to update the neighbor cell list by using the updated CSI-RS configuration information, and transmit an EN-DC configuration update confirmation information to the first base station; and further configured to determine whether the second base station is located in a coverage of the first relay node, determine whether the second base station supports a preset signaling radio bearer measurement under a condition that the second base station is located in the coverage of the first relay node, transmit the updated CSI-RS configuration information to the second base station by using the EN-DC configuration update information under a condition that the second base station supports the preset signaling radio bearer measurement, and discard the updated CSI-RS configuration information under a condition that the second base station does not support the preset signaling radio bearer measurement; and the second base station, configured to indicate a terminal in a coverage of the second base station to measure cells associated with the first base station according to the updated CSI-RS configuration information.

* * * * *